United States Patent
Manlove et al.

(10) Patent No.: US 7,119,705 B2
(45) Date of Patent: Oct. 10, 2006

(54) SHIELDED CAPACITIVE LOAD CELL APPARATUS RESPONSIVE TO WEIGHT APPLIED TO A VEHICLE SEAT

(75) Inventors: Gregory J. Manlove, Kokomo, IN (US); Robert K Constable, Kokomo, IN (US); Ashraf K. Kamel, Indianapolis, IN (US); Gregory A. Cobb, Kokomo, IN (US); Duane D. Fortune, Lebanon, IN (US); William W. Fultz, Carmel, IN (US); Dennis P. Griffin, Noblesville, IN (US); Thomas L. Voreis, Noblesville, IN (US)

(73) Assignee: Delphi Technologies, Inc., Troy, MI (US)

( * ) Notice: Subject to any disclaimer, the term of this patent is extended or adjusted under 35 U.S.C. 154(b) by 156 days.

(21) Appl. No.: 10/978,260

(22) Filed: Oct. 30, 2004

(65) Prior Publication Data

US 2006/0092032 A1 May 4, 2006

(51) Int. Cl.
*G08B 71/00* (2006.01)

(52) U.S. Cl. .............. 340/667; 340/438; 340/665; 340/666; 701/45; 346/40; 280/734; 177/144; 361/312; 73/862.473

(58) Field of Classification Search ........... 340/438, 340/665, 666, 667; 701/45; 346/40; 280/734, 280/735
See application file for complete search history.

(56) References Cited

U.S. PATENT DOCUMENTS

| | | | |
|---|---|---|---|
| 4,266,263 A | 5/1981 | Haberl et al. | |
| 4,836,033 A | 6/1989 | Seitz | |
| 5,142,921 A | 9/1992 | Stewart et al. | |
| 5,189,376 A | 2/1993 | Roberge et al. | |
| 5,878,620 A | 3/1999 | Gilbert et al. | |
| 6,218,632 B1* | 4/2001 | McCarthy et al. | 177/144 |
| 6,275,047 B1 | 8/2001 | Zoellick et al. | |
| 6,448,789 B1 | 9/2002 | Kraetzl | |
| 6,499,359 B1* | 12/2002 | Washeleski et al. | 73/862.473 |
| 6,703,845 B1 | 3/2004 | Stanley et al. | |
| 6,927,678 B1* | 8/2005 | Fultz et al. | 340/438 |
| 6,999,301 B1* | 2/2006 | Sanftleben et al. | 361/312 |
| 2003/0009273 A1 | 1/2003 | Stanley et al. | |
| 2004/0113634 A1 | 6/2004 | Stanley et al. | |
| 2005/0231379 A1* | 10/2005 | Sprecher et al. | 340/667 |

FOREIGN PATENT DOCUMENTS

| | | |
|---|---|---|
| DE | 34 28 699 | 2/1986 |
| DE | 37 21 113 | 1/1989 |
| EP | 0 381 596 | 8/1990 |

* cited by examiner

OTHER PUBLICATIONS

European Search Report dated Jun. 15, 2006.

*Primary Examiner*—Jeffery Hofsass
*Assistant Examiner*—Samuel J Walk
(74) *Attorney, Agent, or Firm*—Jimmy L. Funke

(57) ABSTRACT

The capacitance of a shielded capacitive load cell is determined so as to minimize the effect of stray or parasitic capacitance between the load cell and other objects including the shield. The load cell conductors are coupled across input and output terminals of an operational amplifier that is tied to a reference voltage. A constant current is applied to the load cell, and the resulting rate of change in voltage at the amplifier output is measured as a representation of the load cell capacitance. In a vehicle seat sensor application including an electromagnetic interference shield between the load cell and the seating surface, the amplifier output is coupled to the load cell electrode furthest from the shield, the amplifier maintains the other load cell electrode at a virtual reference voltage, and the shield is tied to the reference voltage.

15 Claims, 2 Drawing Sheets

SHIELDED CAPACITIVE LOAD CELL APPARATUS RESPONSIVE TO WEIGHT APPLIED TO A VEHICLE SEAT

TECHNICAL FIELD

The present invention relates to a capacitive load cell for estimating occupant weight applied to a vehicle seat, and more particularly to a load cell apparatus that is shielded to prevent electromagnetic interference while being substantially insensitive to capacitive coupling between the load cell and other objects including the shield.

BACKGROUND OF THE INVENTION

Various sensing technologies have been utilized to classify the occupant of a vehicle seat for purposes of determining whether to enable or disable air bag deployment, and/or for purposes of determining how forcefully an air bag should be deployed. The present invention is directed to an approach in which at least one capacitive load cell is installed in a vehicle seat, and the capacitance of the load cell is measured to provide an indication of the weight applied to the seat and/or the distribution of the applied weight. In general, capacitive load cells are well known in the sensing art, such as in the U.S. Pat. No. 4,266,263 to Haberl et al., issued on May 5, 1981. Capacitive load cells have also been applied to vehicle seats for sensing occupant weight and distribution; see, for example, the U.S. Pat. Nos. 4,836,033 to Seitz; U.S. Pat. No. 5,878,620 to Gilbert et al.; U.S. Pat. No. 6,448,789 to Kraetzl; and U.S. Pat. No. 6,499,359 to Washeleski et al.

One of the problems encountered with using a capacitive load cell in a vehicle seat is that stray or parasitic capacitance between the load cell and other objects, including objects resting on or under the seat, tend to influence measurement of the load cell capacitance. Another problem is electromagnetic interference from various electrical devices both inside and outside the vehicle. And in applications that include more than one capacitive load cell or a multi-plate sensor such as disclosed in the aforementioned U.S. Pat. No. 4,836,033 to Seitz, conductive or wet objects placed on the seat can capacitively couple the cells.

The problems associated with electromagnetic coupling and interference can be addressed to some degree by shielding the load cell, as mentioned in the aforementioned U.S. Pat. No. 6,499,359 to Washeleski et al. An analogous approach is suggested in the U.S. Pat. No. 6,703,845 to Stanley et al. in regard to a sensor designed to capacitively interact with a seat occupant, where a driven shield is placed between the sensor and a seat heater element disposed beneath the sensor. However, introducing a shield significantly increases problems associated with stray or parasitic capacitance. Accordingly, what is needed is a capacitive load cell and sensing circuit that provides an accurate and reliable measure of load cell capacitance.

SUMMARY OF THE INVENTION

The present invention is directed to an improved sensor apparatus for measuring weight applied to a vehicle seat with a shielded capacitive load cell, where the load cell capacitance is determined so as to minimize the effect of stray or parasitic capacitance between the load cell and other objects including the shield. The capacitance is determined by coupling the load cell conductors across input and output terminals of an operational amplifier that is tied to a reference voltage, forcing a constant current through the load cell and measuring the resulting rate of change in voltage at the amplifier output. In a vehicle seat sensor application including an electromagnetic interference shield between the sensor and the seating surface, the amplifier output is coupled to the load cell electrode furthest from the shield, the amplifier maintains the other load cell electrode at a virtual reference voltage, and the shield is tied to the reference voltage.

DESCRIPTION OF THE PREFERRED EMBODIMENT

While the shielded capacitive load cell apparatus of the present invention may be used in various applications, it is disclosed herein in the context of an apparatus for detecting the weight and/or distribution of weight applied to a vehicle seat. In general, a capacitive load cell comprises upper and lower conductor plates separated by a compressible non-conductive medium, such that mechanical loading of the cell reduces the separation distance of the conductor plates, increasing the electrical capacitance between the upper and lower plates. Preferably, the capacitive load cell is disposed between the frame and bottom cushion of the seat as depicted herein, but it will be understood that the load cell may be installed in a different location such as in the bottom cushion, in or behind a back cushion, and so on.

Figure 1:
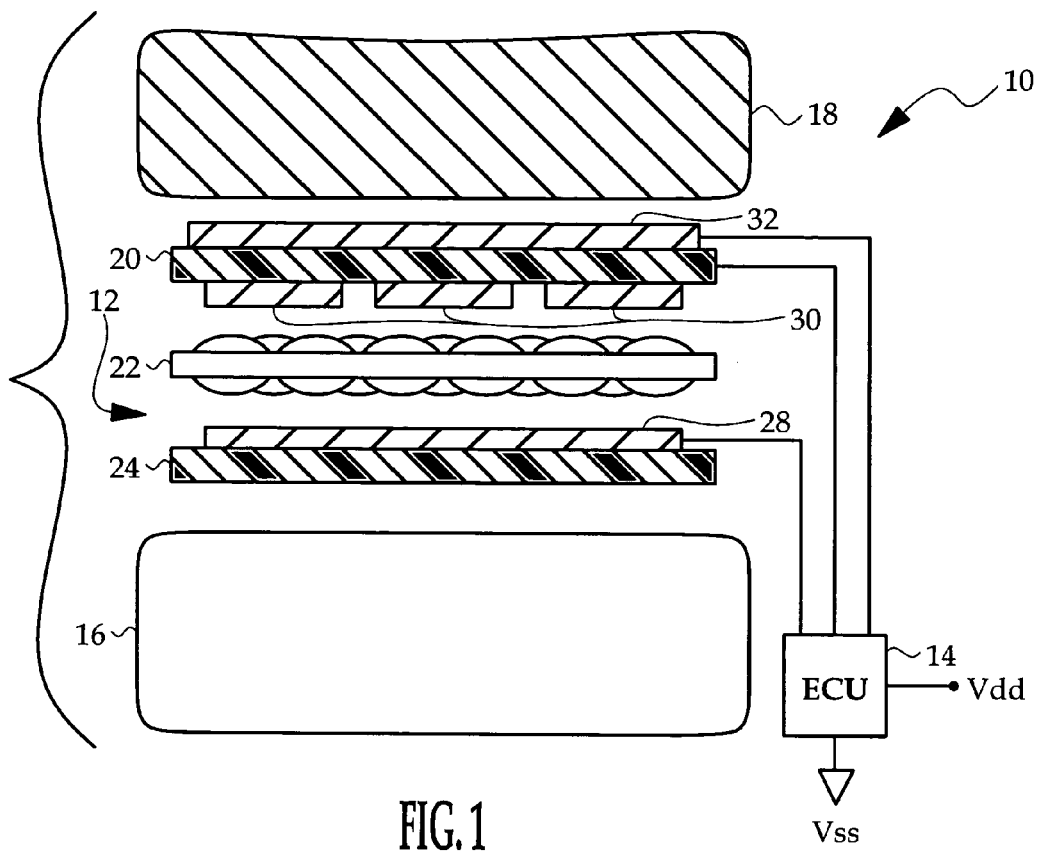
FIG. 1 is an exploded diagram of a vehicle seat and a sensing apparatus including a capacitive load cell and electronic controller according to the present invention.

Referring to FIG. 1, the reference numeral 10 generally designates a seat bottom and sensor apparatus according to this invention. The sensor apparatus includes a shielded capacitive load cell 12 and an electronic control unit (ECU) 14. The load cell 12 is disposed between the seat frame 16 and a foam cushion 18, and includes an upper substrate 20, a fluid-filled elastomeric bladder 22, and a lower substrate 24. A reference plane conductor 28 is formed on lower substrate 24 adjacent bladder 22, and a number of charge plate conductors 30 are formed on upper substrate 20 adjacent bladder 22. A shield conductor 32 is formed on the opposing or outboard face of upper substrate 20 to shield the load cell from electromagnetic interference. The upper and lower substrates 20, 24 are non-conductive, and may be formed of a material such as polyurethane with a thickness of about 0.5 mm. The conductors 28, 30, 32 may be metal foil pads laminated to the respective substrates 20, 24. The reference plane conductor 28, the shield conductor 32, and each of the charge plate conductors 30 are separately coupled to ECU 14, which periodically measures capacitance values between the reference plane conductor 28 and each of the charge plate conductors 30. The measured capacitances provide an indication of the weight applied to seat cushion 18, as well as the distribution of the weight, for purposes of detecting the presence of an occupant and classifying the occupant as a child, an adult, a child seat, or some other classification.

The conventional method of measuring capacitance (as disclosed in the aforementioned U.S. Pat. No. 4,836,033 to Seitz, for example) involves coupling a charging circuit including a low distortion sinusoidal voltage source and a precision resistor in parallel with the load cell capacitor to form a voltage divider, and measuring the voltage at a node between the capacitor and the precision resistor. The measured voltage Vm is related to the RMS voltage Vs of the voltage source, the source frequency ω (in radians), the resistance R of the precision resistor and the load cell capacitance C according to:

$$|Vm|=|Vs|/(1+\omega CR^2)^{1/2}$$

While the conventional method of measuring capacitance seems relatively straight-forward, various practical considerations make it difficult to implement. First, parasitic or stray capacitance between the load cell conductors and other objects can make it difficult or impossible to accurately measure the load cell capacitance; this is particularly true when a metallic shield such as the conductor 32 is placed in close proximity to the load cell conductors to prevent electromagnetic interference. Second, it is difficult to inexpensively produce low distortion sinusoidal voltage sources and precision resistors. Third, the non-linear relationship between Vm and C makes it difficult to accurately measure capacitance over a wide range of values. Fourth, any leakage current at the measurement node will generate a non-linear error in the calculated capacitance value. And fifth, an analog-to-digital data converter is required to convert the measured voltage Vm to a digital value usable by ECU 14.

Figure 2:
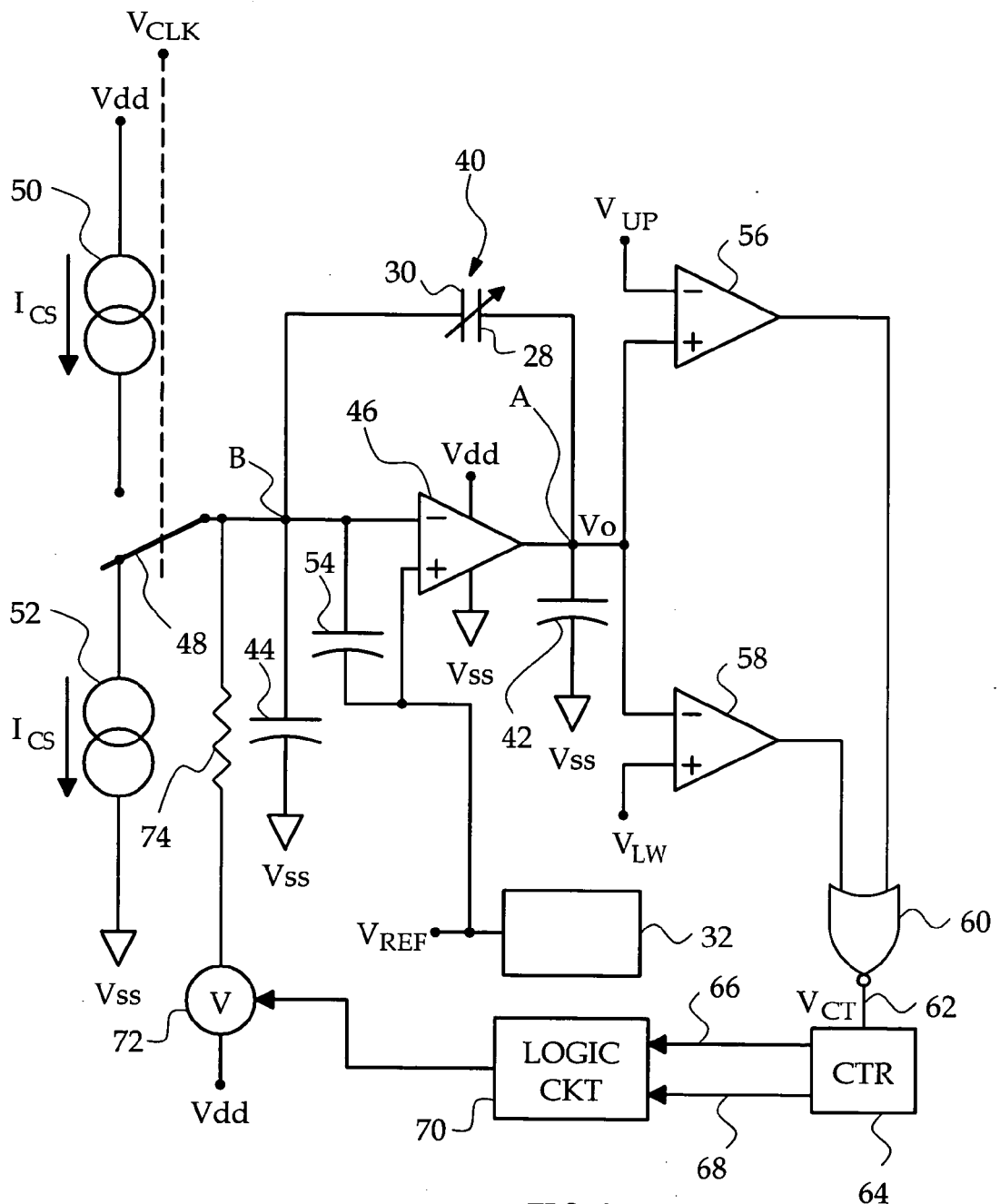
FIG. 2 is a circuit diagram of the electronic controller of FIG. 1, where the load cell of FIG. 1 is depicted as an equivalent capacitance.

The present invention addresses the above-described problems with a capacitance measuring circuit that is inexpensive to implement, linear and virtually immune to errors due to parasitic capacitance and leakage currents. A preferred embodiment of the capacitance measuring circuit is shown in FIG. 2, where the reference plane conductor 28 and a selected charge plate conductor 30 are represented as an equivalent variable capacitor 40. Parasitic capacitance between the reference plane conductor 28 and other objects is represented by the capacitor 42, and parasitic capacitance between the charge plate conductor 30 and other objects including the shield conductor 32 is represented by the capacitor 44. The heart of the capacitance measuring circuit is an operational amplifier 46 referenced to a DC supply voltage Vdd (5 VDC, for example) and the circuit ground Vss. The reference plane conductor 28 is coupled to the amplifier's output at circuit node A, while the charge plate conductor 30 is coupled to the amplifier's negative input at circuit node B. The positive input of amplifier 46 is connected to a reference voltage $V_{REF}$ (2.5 VDC, for example), as is the shield conductor 32. A solid state switching device 48 (illustrated in FIG. 2 as a mechanical switch) controlled by a digital clock signal $V_{CLK}$ alternately couples circuit node B to current source 50 and current sink 52 (implemented with current mirrors, for example), which are configured to source and sink the identical current magnitude $I_{CS}$.

The operational amplifier 46 characteristically attempts to maintain the voltage at its negative input equal to the reference voltage $V_{REF}$ by varying its output voltage $V_O$ at circuit node A. As a result, the amplifier's output voltage $V_O$ decreases in magnitude at a linear rate when circuit node A is coupled to current source 50, and increases in magnitude at the same linear rate when circuit node A is coupled to current sink 52. The linear rate of increase and decrease (i.e., ramp rate RR) is linearly proportional to both $I_{CS}$ and the load cell capacitance C according to:

$$RR=I_{CS}/C$$

Any RF or other interference currents present at circuit node B can be dissipated by utilizing ferrite beads at the amplifier inputs to attenuate the interference frequencies. Additionally, the capacitor 54 provides AC coupling between the inputs; this causes the interference to be in common mode for improved rejection by amplifier 46. The frequency of the clock signal $V_{CLK}$ can be relatively low (a few kilohertz or less) so that the capacitance measurement is substantially unaffected by the interference minimizing components.

Figure 3:
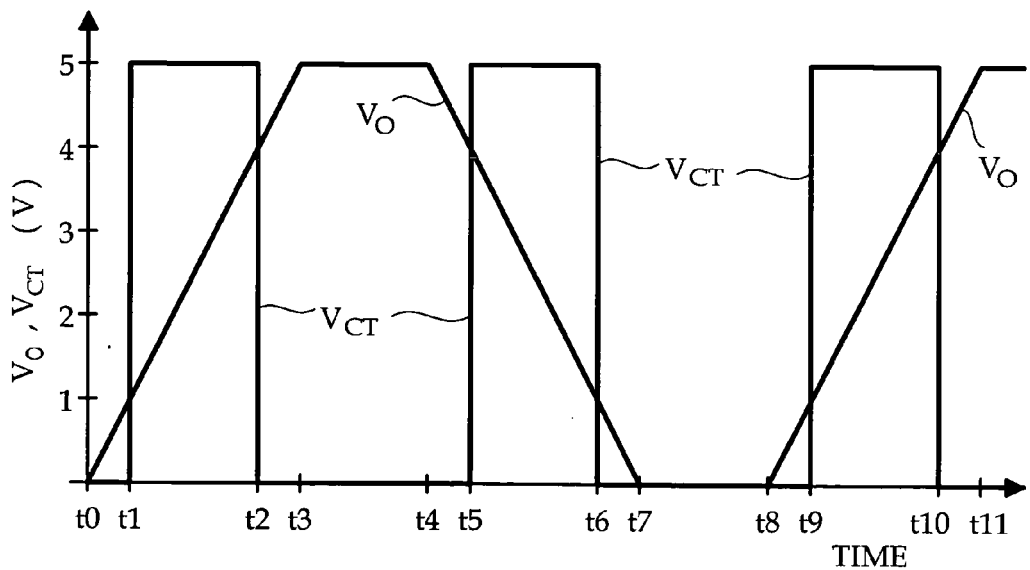
FIG. 3 graphically depicts various voltages typically present in the circuit of FIG. 2 as a function of time.

The period of $V_{CLK}$ is such that the amplifier output voltage $V_O$ reaches the respective voltage limit Vdd or Vss before the switching device 48 changes state. The resulting operation of the circuit is graphically depicted in FIG. 3, where $V_O$ increases from 0V to 5V in the time interval t0–t3 (and t8–t11) due to the operation of current sink 52 and decreases from 5V to 0V in the time interval t4–t7 due to the operation of current source 50. The circuit of FIG. 2 measures the ramp rate RR by measuring the time for $V_O$ to increase or decrease by a reference amount defined by upper and lower reference voltages $V_{UP}$ and $V_{LW}$ between 0V and 5V. In the illustrated embodiment, $V_{UP}$ has a value of 4.25V, and $V_{LW}$ has a value of 0.75V, as indicated in FIG. 3. Referring to FIG. 2, the comparators 56 and 58 respectively compare $V_O$ to reference voltages $V_{UP}$ and $V_{LW}$, and provide outputs to NOR-gate 60 to produce a digital counter voltage $V_{CT}$ on line 62. As shown in FIG. 3, $V_{CT}$ assumes a logic-one level when $V_{CT}$ is between $V_{UP}$ and $V_{LW}$, and otherwise assumes a logic-zero level. Of course, hysteresis may be added to comparators 56 and 58 to prevent additional state changes due to noise. Since the change in output voltage is the same regardless of whether $V_O$ is increasing or decreasing, the duration of the logic-one intervals of $V_{CT}$ (i.e., intervals t1–t2, t5–t6, t9–t10, etc.) can be used to accurately and directly represent the load cell capacitance C. That is, the measured interval ΔT is given by $[C^* (V_{UP}-V_{LW})]/I_{CS}$, where $V_{UP}$, $V_{LW}$ and $I_{CS}$ are all constants. In the diagram of FIG. 2, the counter 64 measures the ΔT intervals and produces a Trise output on line 66 corresponding to the periods of increasing $V_O$, and a Tfall output on line 68 corresponding to the periods of decreasing $V_O$. Of course, the dead time between successive measurements of the ΔT interval could be nearly eliminated by coordinating the state changing of switching device 48 with the outputs of comparators 56 and 58; this would improve the sampling rate of the circuit, which may be important in applications where several load cell capacitances are successively measured.

It will thus be seen that the circuit of FIG. 2 overcomes the above-noted problems associated with the conventional capacitance measurement approach. The shield conductor 32 is tied to the fixed reference voltage $V_{REF}$, operational amplifier 46 maintains the charge plates 30 at a virtual reference voltage $V_{REF}'$ substantially equal to $V_{REF}$, and the reference plane conductor 28 is tied to circuit node A which linearly increases and decreases in voltage. Accordingly, parasitic capacitance between the charge plates 30 and the shield conductor 32 is minimized. Furthermore, the effect of parasitic capacitance 44 is attenuated by the gain G of operational amplifier 46; that is, the measured capacitance is given by the sum $[C_{40}+(C_{44}/G)]$, where $C_{40}$ is the capacitance of load cell 12, and $C_{44}$ is the capacitance of parasitic capacitor 44. If the gain G is sufficient to maintain $V_{REF}'$ substantially equal to $V_{REF}$, the parasitic capacitance 44 will not significantly influence the measurement accuracy. Moreover, the parasitic capacitance 42 will not significantly influence the measurement accuracy so long as operational amplifier 46 has sufficient drive capability to charge parasitic capacitance 42 at the ramp rate of output voltage $V_O$. Also, the relationship between the measured time (Trise or Tfall) and the load cell capacitance is linear (instead of nonlinear) so that the load cell capacitance can be measured over a wide range of values, such as 1000-to-1. Finally, the circuit of FIG. 3 is easily and cost effectively implemented since the input and output signals are square-waves (i.e., low distortion sinusoidal sources and analog-to-digital signal conversion are not required), and the current sources 50, 52 are implemented and calibrated more easily than precision resistors. In a discrete implementation, the current sources 50 and 52 and switching device 48 could be replaced by a single precision resistor of resistance R coupled to a digital input such as $V_{CLK}$; in this case $I_{VS}=V_{REF}'/R$ since operational amplifier 46 holds the circuit node B at virtual reference voltage $V_{REF}'$.

Any leakage current at the amplifier output (i.e., circuit node A) will not affect the capacitance measurement so long as operational amplifier 46 has sufficient drive strength to handle the additional load. Since leakage currents at the amplifier inputs can produce deviation between Trise and Tfall, the load cell capacitance can be represented by a normalized time Tnor according to the equation:

$$Tnor=(2*Trise*Tfall)/(Trise+Tfall)$$

However, since input leakage currents greater than $I_{CS}$ can impair the circuit operation, the circuit of FIG. 3 may include additional elements for detecting and compensating for input leakage currents. Such additional elements include a logic circuit 70 for detecting input leakage currents by computing the difference between Trise and Tfall, and a digitally controlled source (voltage source 72 and resistor 74) for introducing a DC current into or out of circuit node B to force Trise=Tfall. Ordinarily, the voltage source 72 is set to $V_{REF}$ so that the compensation current is zero. If logic circuit 70 detects that Trise is greater than Tfall, the source voltage is incremented until Trise=Tfall. Similarly, if logic circuit 70 detects that Trise is less than Tfall, the source voltage is decremented until Trise=Tfall. Of course, the voltage source 72 and resistor 74 can be replaced by an adjustable current supply of some other design, if desired.

While the method of the present invention has been described with respect to the illustrated embodiment, it is recognized that numerous modifications and variations in addition to those mentioned herein will occur to those skilled in the art. For example, a compressible insulator other than the elastomeric bladder 22 may be used, a multiplexer may be used to selectively couple the capacitance measurement circuit to different charge plates 30 of the sensor assembly, the charge plates 30 and reference plane conductor 28 may be reversed, the ramp rate RR may be determined by measuring the voltage change over a fixed time interval, and so on. Furthermore, the shield conductor 32 may be maintained at a reference voltage (including ground potential) other than $V_{REF}$ if desired; although this would increase parasitic capacitance, the operational amplifier 46 minimizes the effects of parasitic capacitance as described above. Accordingly, it is intended that the invention not be limited to the disclosed embodiment, but that it have the full scope permitted by the language of the following claims.

The invention claimed is:

1. Apparatus for measuring a weight applied to a seating surface of a vehicle seat, comprising:
   a load cell disposed in said seat including first and second conductive plates separated by a compressible insulator;
   a conductive shield disposed between said seating surface and said load cell; and
   circuitry coupled to said load cell and said conductive shield, including means for maintaining said shield at a reference voltage, an operational amplifier having a first input coupled to said first conductive plate and an output coupled to said second conductive plate, current supply elements for supplying a constant current to said load cell, and means for determining a capacitance of said load cell based on a rate of change in voltage at the output of said operational amplifier, said capacitance providing an indication of the weight applied to said seating surface.

2. The apparatus of claim 1, where said operational amplifier has a second input that is coupled to said reference voltage so that said operational amplifier maintains said first conductive plate substantially at said reference voltage.

3. The apparatus of claim 2, where said circuitry includes interference suppression elements including a capacitor coupled between said first and second inputs.

4. The apparatus of claim 1, wherein said current supply elements alternate a direction of said constant current so that the voltage at the output of said operational amplifier alternately increases and decreases.

5. The apparatus of claim 4, including means for computing a capacitance of said load cell based on a rate of increase in voltage at the output of said operational amplifier and a rate of decrease in voltage at the output of said operational amplifier.

6. The apparatus of claim 5, wherein said circuitry includes means for detecting an input leakage current of said operational amplifier based on a difference between said rate of increase and said rate of decrease, and means for adjusting the current supplied to said load cell to compensate for the detected input leakage current.

7. The apparatus of claim 1, wherein said load cell comprises first and second substrates disposed above and below said compressible insulator for respectively supporting said first and second conductive plates, said first substrate additionally supporting said conductive shield.

8. The apparatus of claim 1, where said first conductive plate comprises a plurality of electrically isolated plate elements, and said circuitry includes means for selectively coupling said first input of said operational amplifier to any one of said plate elements to determine a capacitance between said one plate element and said second conductive plate.

9. A capacitive load cell, comprising:
   first and second conductive plates separated by a compressible insulator; and
   circuitry coupled to said first and second conductive plates, including an operational amplifier having a first input coupled to said first conductive plate and an output coupled to said second conductive plate, current supply elements for forcing a constant current between said first and second conductive plates, and means for determining a capacitance between said first and second conductive plates based on a rate of change in voltage at the output of said operational amplifier.

10. The capacitive load cell of claim 9, where said operational amplifier has a second input that is coupled to a reference voltage so that said operational amplifier maintains said first conductive plate substantially at said reference voltage.

11. The capacitive load cell of claim 10, where said circuitry includes interference suppression elements including a capacitor coupled between said first and second inputs.

12. The capacitive load cell of claim 9, wherein said current supply elements alternate a direction of said constant current so that the voltage at the output of said operational amplifier alternately increases and decreases.

13. The capacitive load cell of claim 12, where said capacitance is determined based on a rate of increase in voltage at the output of said operational amplifier and a rate of decrease in voltage at the output of said operational amplifier.

14. The capacitive load cell of claim 13, wherein said circuitry includes means for detecting an input leakage current of said operational amplifier based on a difference between said rate of increase and said rate of decrease, and means for adjusting the current between said first and second conductive plates to compensate for the detected input leakage current.

15. The capacitive load cell of claim 9, where said first conductive plate comprises a plurality of electrically isolated plate elements, and said circuitry includes means for selectively coupling said first input of said operational amplifier to any one of said plate elements to determine a capacitance between said one plate element and said second conductive plate.

* * * * *